United States Patent
Azami

(10) Patent No.: US 10,320,026 B2
(45) Date of Patent: Jun. 11, 2019

(54) ELECTRODE FOR SECONDARY BATTERY AND SECONDARY BATTERY USING SAME

(71) Applicant: NEC Corporation, Tokyo (JP)

(72) Inventor: Takeshi Azami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/521,272

(22) PCT Filed: Oct. 16, 2015

(86) PCT No.: PCT/JP2015/079352
§ 371 (c)(1),
(2) Date: Apr. 21, 2017

(87) PCT Pub. No.: WO2016/063813
PCT Pub. Date: Apr. 28, 2016

(65) Prior Publication Data
US 2017/0309948 A1    Oct. 26, 2017

(30) Foreign Application Priority Data
Oct. 21, 2014  (JP) .................................. 2014-214820

(51) Int. Cl.
| | | |
|---|---|---|
| *H01M 10/05* | (2010.01) | |
| *H01M 10/052* | (2010.01) | |
| *H01M 4/13* | (2010.01) | |
| *H01M 4/62* | (2006.01) | |
| *H01M 4/139* | (2010.01) | |
| *H01M 4/02* | (2006.01) | |

(52) U.S. Cl.
CPC .............. *H01M 10/05* (2013.01); *H01M 4/13* (2013.01); *H01M 4/62* (2013.01); *H01M 4/625* (2013.01); *H01M 4/139* (2013.01); *H01M 10/052* (2013.01); *H01M 2004/028* (2013.01)

(58) Field of Classification Search
CPC ........ H01M 4/13; H01M 4/622; H01M 4/625; H01M 10/05; H01M 10/0525; H01M 2004/028
See application file for complete search history.

(56) References Cited

U.S. PATENT DOCUMENTS

| | | | | |
|---|---|---|---|---|
| 8,492,028 B2 * | 7/2013 | Itou | .................... | H01M 4/131 |
| | | | | 429/218.1 |
| 9,876,231 B2 * | 1/2018 | Murase | ................. | H01M 4/622 |
| 2008/0160405 A1 * | 7/2008 | Yang | .................... | H01M 4/131 |
| | | | | 429/215 |
| 2012/0153231 A1 | 6/2012 | Wang et al. | | |
| 2012/0301784 A1 | 11/2012 | Yano et al. | | |
| 2013/0295439 A1 * | 11/2013 | Masarapu | ................ | H01B 1/24 |
| | | | | 429/163 |
| 2015/0104701 A1 * | 4/2015 | Azami | .................. | H01M 4/131 |
| | | | | 429/188 |
| 2015/0311532 A1 * | 10/2015 | Chen | ..................... | H01M 4/625 |
| | | | | 429/213 |
| 2016/0204415 A1 * | 7/2016 | Takahashi | ............. | H01M 4/505 |
| | | | | 429/223 |
| 2017/0214048 A1 * | 7/2017 | Qian | ..................... | H01M 4/622 |
| 2017/0271658 A1 * | 9/2017 | Qian | ..................... | H01M 4/366 |

FOREIGN PATENT DOCUMENTS

| | | | |
|---|---|---|---|
| JP | 2003-77476 | | 3/2003 |
| JP | 2009-155593 | * | 7/2009 |
| JP | 2010-157512 | | 7/2010 |
| JP | 2012-134125 | | 7/2012 |
| JP | 2012-134149 | | 7/2012 |
| JP | 2012-138359 | | 7/2012 |
| JP | 2012-221672 | | 11/2012 |
| JP | 2012-243696 | | 12/2012 |
| WO | WO 2013/150937 | * | 10/2013 |
| WO | WO 2015/029525 | * | 3/2015 |

OTHER PUBLICATIONS

Machine translation of JP 2009-155593, published on Jul. 16, 2009 (Year: 2009).*
Machine translation of JP 2010-024455, published on Feb. 4, 2010 (Year: 2010).*
International Search Report and Written Opinion dated Nov. 17, 2015, in corresponding PCT International Application.

* cited by examiner

*Primary Examiner* — Anca Eoff

(74) *Attorney, Agent, or Firm* — Finnegan, Henderson, Farabow, Garrett & Dunner, L.L.P.

(57) ABSTRACT

A secondary battery which is highly safe even when it becomes in excessively high-temperature conditions and is excellent in cycle characteristics, and an electrode for a secondary battery are provided. The present invention relates to an electrode for a secondary battery comprising a maleimide compound and a conductive agent, wherein the conductive agent comprises at least one selected from carbon nanotube and carbon nanohorns.

14 Claims, 3 Drawing Sheets

ELECTRODE FOR SECONDARY BATTERY AND SECONDARY BATTERY USING SAME

CROSS-REFERENCE TO RELATED PATENT APPLICATIONS

This application is a National Stage Entry of International Application No. PCT/JP2015/079352, filed Oct. 16, 2015, which claims priority from Japanese Patent Application No. 2014-214820, filed Oct. 21, 2014. The entire contents of the above-referenced applications are expressly incorporated herein by reference.

TECHNICAL FIELD

The present invention relates a secondary battery electrode, a secondary battery using the same, and a method for manufacturing the same.

BACKGROUND ART

Secondary batteries such as lithium ion secondary batteries have advantages such as high energy density, small self-discharge, excellent long-term reliability and the like, and therefore they have been put into practical use in notebook-type personal computers and mobile phones. More recently, the development of the high performance secondary battery having further improved capacity and energy density is demanded due to, in addition to the trend of high functionality of electronic equipment, the expansion of market of motor driven vehicles such as electric vehicles and hybrid vehicles and the acceleration of the development of domestic and industrial power storage systems.

However, in the batteries having high capacity and high energy density, the temperature rise of the battery is liable to occur when an external shock is applied or they are in overcharged state. In particular, in a battery containing a positive electrode active material having high capacity and high energy density, for example compounds of layered rock-salt structure containing nickel or cobalt, there is a tendency that energy released during thermal decomposition is increased, and therefore, the consideration to safety is furthermore needed.

To increase the safety of batteries of high energy density, there have been conducted various studies so far. In particular, with respect to the heat generation in batteries, there have been conducted studies on cut off mechanism to stop the function of the battery when the battery temperature rises. For example, Patent Document 1 discloses a lithium battery comprising a positive electrode plate, a negative electrode plate and a heat insulating layer disposed on the charge-discharge surface of the electrode plates, the lithium battery being capable of reducing the electrical conductivity when the temperature of the lithium battery increases. Patent Document 2 discloses a lithium battery having a thermal actuation protective film formed on the material surface of a positive electrode plate or a negative electrode plate, in which if the temperature of the lithium battery rises to the thermal actuation temperature of the thermally actuation protective film, the thermal actuation protective film undergoes a cross-linking reaction to prevent thermal runaway. Patent Document 3 discloses a lithium battery comprising an electrode plate formed of a plurality of the electrode material layer and comprising a thermally activatable material in at least one of these electrode material layers, in which when the temperature of the lithium battery rises, the thermally activatable material is activated to undergo cross-linking reaction, thereby reducing the electrical conductivity. In the batteries disclosed in these Patent Documents 1, 2 and 3, the heat insulating layer (Patent Document 1), the thermal actuation protection film (Patent Document 2) and the electrode material layer (Patent Document 3), respectively, comprises a nitrogen-containing polymer formed by the reaction of bismaleimide monomer and barbituric acid, and the conductivity of the batteries are lowered by such a mechanism that when the temperature of the batteries rises, the polymer is converted into a cross-linked polymer which inhibits the diffusion of lithium ions. In other words, these batteries provide a shutdown function to batteries by using heat-reactivity of maleimide group of the polymer.

CITATION LIST

Patent Document

Patent Document 1: Japanese Patent Laid-Open No. 2012-138359
Patent Document 2: Japanese Patent Laid-Open No. 2010-157512
Patent Document 3: Japanese Patent Laid-Open No. 2012-134149

SUMMARY OF INVENTION

Technical Problem

However, the use of an electrode containing a resin compound having a maleimide group has a problem that the resistance of the secondary battery becomes higher, and therefore sufficient cycle characteristics is not obtained.

Solution to Problem

The present invention relates to the following items.
An electrode for a secondary battery comprising a maleimide compound and a conductive agent, wherein
the conductive agent comprises at least one selected from carbon nanotubes and carbon nanohorns.

Advantageous Effect of Invention

According to the present invention, there is provided a secondary battery which is highly safe even when it becomes in excessively high temperature conditions and is excellent in cycle characteristics.

DESCRIPTION OF EMBODIMENTS

Figure 1:
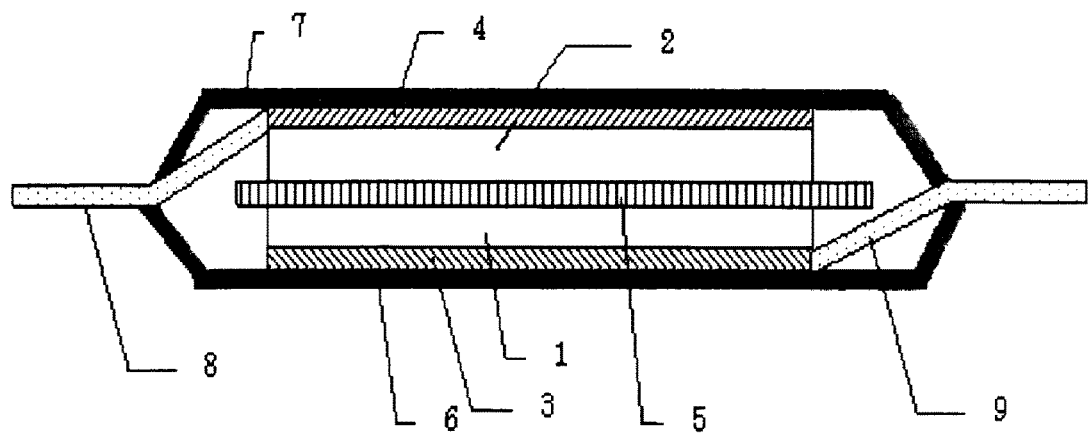
FIG. 1 shows an example of a cross-sectional structure of a secondary battery of the present embodiment.

<Electrode>
The secondary battery electrode (may be simply referred to as "electrode") of the present embodiment comprises a maleimide compound, and at least one selected from carbon nanotubes and carbon nanohorns as a conductive agent. In this specification, the conductive agent selected from carbon nanotubes and carbon nanohorns is referred to as "first conductive agent".

The electrode of the present embodiment comprises a maleimide compound and a first conductive agent, and preferably, the surface of the electrode active material is covered with the maleimide compound and the first conductive agent. An electrode is formed by forming, on a current collector, an electrode active material layer containing an electrode active material covered with the maleimide compound and the first conductive agent, and an electrode binder. The electrode comprising the maleimide compound and the first conductive agent can be either one or both of a positive electrode and a negative electrode, but is preferably at least a positive electrode. A lithium-ion secondary battery using the electrode of the present embodiment (hereinafter, may be referred to as "battery") has excellent cycle characteristics, and also excellent in safety when the lithium ion secondary battery is brought to a high temperature by overcharge or the like.

In the electrode of the present embodiment, when the temperature of the lithium-ion secondary battery rises to high temperature (for example, 80° C. or higher, preferably 80 to 280° C.), since the reaction of maleimide groups in the maleimide compound takes place to form cross-linking, diffusion and conduction of lithium ions are blocked (shut down), and therefore, the thermal runaway of the battery is prevented. On the other hand, whereas there is a problem that the use of maleimide compound lowers a conductivity to increase the resistance of the secondary battery, the electrode of the present embodiment suppresses the decrease in conductivity by containing the first conductive agent, and a battery using this electrode is excellent in cycle characteristics. The present inventor has found that the use of the first conductive agent as the conductive agent in an electrode comprising a maleimide compound results in a battery particularly excellent in cycle characteristics and safety. Firstly, maleimide compound contained in the electrode of the present embodiment and the first conductive agent are described.

(Maleimide Compound)

Maleimide compounds is not particularly limited as long as it is a compound having at least one maleimide group in a molecule, but it is preferably a compound having two or more maleimide groups, and more preferably a compound having 3 or more maleimide groups. If the number of maleimide groups in a molecule is larger, it is easy to form a network by cross-linking when temperature of the secondary battery is elevated.

Examples of maleimide compound include maleimide monomers having maleimide group(s), maleimide resin compounds obtained by polymerizing maleimide monomers and the like, but the maleimide compound preferably comprises a maleimide resin compound. The maleimide resin compounds may be homopolymers or copolymers.

Examples of the maleimide monomer include monomaleimide monomers that is used in the preparation of maleimide resin compounds described in detail below, bismaleimide monomers, trismaleimide monomers and multi-maleimide monomers of tetra- or more-functionality.

As a preferred embodiment of the maleimide resin compound, description will be made to hyperbranched polymers having a highly branched structure. Since hyperbranched polymers have a large number of terminal maleimide groups, they can cross-link to form a network when temperature of the battery is elevated, and to form a protective film on the active material surface for preventing the diffusion and conductivity of lithium ions, and therefore excellent shutdown function can be achieved. Examples of such hyperbranched polymers include hyperbranched polymers obtained by reacting a maleimide monomer and a dione compound as disclosed in JP-A-2010-24455 and JP-A-2012-138359.

As maleimide monomers to form a hyperbranched polymer, monomaleimide monomers, bismaleimide monomers, trismaleimide monomers and tetra or more-functional multimaleimide monomers can be used in combination, but it is preferred that at least a bismaleimide monomer is contained.

As the bismaleimide monomer, compounds represented by the following formula (1) or (2) are exemplified.

Formula (1)

(in the formula, $R_1$ is —R—, —R—$NH_2$—R—, —C(O)—, —R—C(O)—R—, —R—C(O)—, —O—, —O—O—, —S—, —S—S—, —S(O)—, —R—S(O)—R—, —$SO_2$—, —($C_6H_4$)—, —R—($C_6H_4$)—R—, —R—($C_6H_4$)—O—, —($C_6H_4$)—($C_6H_4$)—, —R—($C_6H_4$)—($C_6H_4$)—R—, or —R—($C_6H_4$)—($C_6H_4$)—O—, R is an alkylene group having 1 to 8 carbon atoms, —($C_6H_4$)— is a phenylene group, and —($C_6H_4$)—($C_6H_4$)— represents a biphenylene group.)

Formula (2)

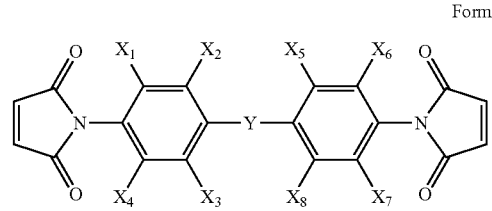

(in the formula, Y is an alkylene group having 1 to 8 carbon atoms, —C(O)—, —O—, —O—O—, —S—, —S—S—, —S(O)—, or —$SO_2$—, and $X_1$, $X_2$, $X_3$, $X_4$, $X_5$, $X_6$, $X_7$ and $X_8$ each independently represent halogen, hydrogen, alkyl group having 1 to 8 carbon atoms, cycloalkyl group having 1 to 8 carbon atoms or silylalkyl group having 1 to 8 carbon atoms.)

Specific examples of the bismaleimide monomer include, but not particularly limited to, N, N'-bismaleimide-4,4'-diphenylmethane, 1,1'-(methylenelli-4,1-phenylene) bismaleimide, N, N'-(1,1'-biphenyl-4,4'-diyl)bismaleimide, N, N'-(4-methyl-1,3-phenylene)bismaleimide, 1,1'-(3,3'-dimethyl-1,1'-biphenyl-4,4'-diyl)bismaleimide, N, N'-ethylenedimaleimide, N, N'-(1,2-phenylene)dimaleimide, N, N'-(1,3-phenylene)dimaleimide, N, N'-thiodimaleimide, N, N'-dithiodimaleimide, N, N'-ketonedimaleimide, N, N'-methylene-bismaleimide, bismaleimide methyl ether, 1,2-bis-(maleimide)-1,2-ethanethol, N, N'-4,4'-diphenylether-bismaleimide, or 4,4'-bis(maleimide)diphenylsulfone and the like.

As monomaleimide monomers, trimaleimide monomers and multi-maleimide monomers, compounds represented by the following formulae (3) to (6) are exemplified.

Formula (3)

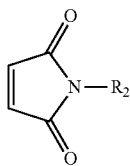

(in the formula, $R_2$ is a phenyl group, an alkyl group having 1 to 8 carbon atoms or a cycloalkyl group having 5 to 8 carbon atoms)

Formula (4)

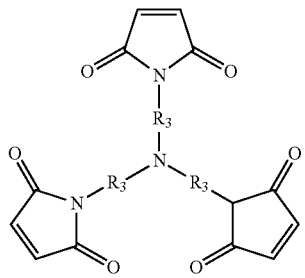

(in the formula, $R_3$ each independently represents a phenylene group, an alkylene group having 1 to 8 carbon atoms or a cycloalkylene group having 5 to 8 carbon atoms)

Formula (5)

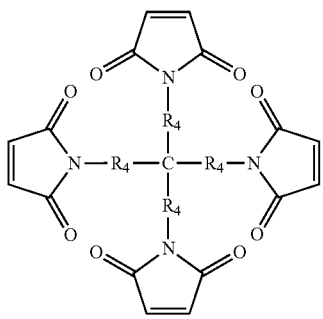

(in the formula, $R_4$ each independently represents a phenylene group, an alkylene group having 1 to 8 carbon atoms or a cycloalkylene group having 5 to 8 carbon atoms)

Formula (6)

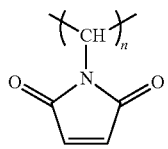

(in the formula, n is 1 to 1000, preferably 1 to 500, more preferably 5 to 200)

When monomaleimide, trimaleimide and or multi-maleimide monomer is used in combination with bismaleimide monomer(s), it is preferred that bismaleimide monomer(s) is contained in the range of 50 to 100 mol %, and more preferably in the range of 50 to 99 mol % based on the total maleimide monomers.

Examples of the dione compound include, for example, barbituric acid or its derivatives represented by the following formulae (7) to (10), and acetylacetone or its derivatives represented by the following formula (11). In the present specification, the dione compound does not include a compound having a maleimide group.

Formula (7)

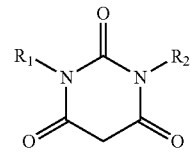

Formula (8)

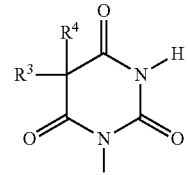

Formula (9)

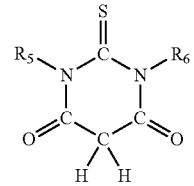

Formula (10)

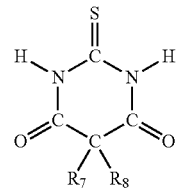

(in the formulae, $R_1$, $R_2$, $R_3$, $R_4$, $R_5$, $R_6$, $R_7$ and $R_8$ are each independently, —H, —CH$_3$, —C$_2$H$_5$, —C$_6$H$_5$, —CH(CH$_3$)$_2$, —CH$_2$CH(CH$_3$)$_2$, —CH$_2$CH$_2$CH(CH$_3$)$_2$, or —CH(CH$_3$)CH$_2$CH$_2$CH$_3$.)

In the case that all of $R_1$, $R_2$, $R_3$ and $R_4$ in the formula represent hydrogen, formulae (7) and (8) represents barbituric acid. Preferably, the dione compound comprises barbituric acid.

Formula (11)

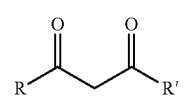

(in the formula, R and R' each are an aliphatic group, an aromatic group or a heterocyclic group.)

In the formula (11), examples of the aliphatic group include straight-chain or branched alkyl group having 1 to 6 carbon atoms. Examples of the aromatic group include phenyl group, naphthyl group, benzyl group and phenethyl group. Examples of the heterocyclic group include saturated heterocyclic groups or unsaturated heterocyclic groups having 4 to 6 membered ring comprising S, O or N as hetero atom(s).

In the case that all of R and R' each represent a methyl group, the compound represented by the formula (11) is acetylacetone.

A hyperbranched polymer can be formed by polymerizing a maleimide monomer containing a bismaleimide monomer and an dione compound in a solvent containing a Bronsted base.

The molar ratio of the dione compound and the maleimide monomer (dione Compound:maleimide monomer) is about 1:20 to 4:1. More preferably, the molar ratio is about 1:5 to 2:1, and more suitably about 1:3 to 1:1.

Examples of the solvent containing a Bronsted base that can be used include, for example, N-methylpyrrolidone (NMP), dimethylformamide (DMF), dimethylacetamide (DMAC), pyrrolidone, N-dodecyl pyrrolidone, or combinations thereof. In addition, in the above-mentioned Bronsted base, other solvents that are Bronsted neutral, such as y-butyrolactone (GBL) may be added. In some cases, if a solvent containing a Bronsted base is used, the reaction temperature can be set lower temperature, and therefore it is preferred.

The reaction temperature is, for example, 20 to 150° C., and preferably 20 to 100° C.

In the above reaction, by adding the dione batchwise to the reaction mixture, it is possible to control the degree of branching, the degree of polymerization, the structure and the like of the hyperbranched polymer.

The molecular weight of the hyperbranched polymer (mass average molecular weight) is not particularly limited, but it is preferably in the range of 400 to 100,000, more preferably in the range of 800 to 20000, and furthermore preferably in the range of 1,000 to 10,000. In the present specification, the mass average molecular weight is measured by gel permeation chromatography (GPC) using a calibration curve using monodisperse molecular weight polystyrene as a standard substance to convert molecular weight.

The degree of branching (%) of the hyperbranched polymer is not limited in particular, but it is preferably 30 to 100%, more preferably 40 to 90%, and further preferably 50 to 80%. The degree of branching of the polymer is represented by:

$$(D+T)/(D+T+L)\times 100(\%)$$

wherein T is a number of terminal portions of the polymer, D is a number of branched portions and L is a number of unbranched portions.

The hyperbranched polymer preferably has three or more terminal maleimide groups in one molecule.

As another embodiment of the maleimide resin compound, polyamino bismaleimides obtained by reacting a bismaleimide with a diamine are exemplified. The active material may be covered by such a maleimide resin in a form of prepolymer or resin formed from a prepolymer and having a mass average molecular weight of, for example, 400 to about 100,000 (more preferably 800 to 20,000, and more preferably 100 to 10,000). Polyamino bismaleimide resins can form a protective film by cross-linking when the temperature of the battery is elevated. Among these, prepolymers formed from a bismaleimide compound and an alicyclic diamine have good solvent solubility, and do not require a long time and high temperature for curing, as compared with prepolymers formed from a bismaleimide compound and a straight chain aliphatic diamine or an aromatic diamine, and therefore they can be preferably used in the present embodiment.

These polyamino bismaleimide prepolymers can be obtained by mixing an alicyclic diamine and a bismaleimide compound (alicyclic diamine:bismaleimide compound=1:1.5 to 3 (molar ratio)) in a suitable reaction solvent and allowing them to react.

Here, bismaleimide compounds used for the preparation of polyamino bismaleimide are not particularly limited, and may be a bismaleimide exemplified in the production of the hyperbranched polymers described above. Examples of the alicyclic diamine include 4,4'-methylene-biscyclohexane diamine, 1,2-cyclohexanecliamine, 1,3-cyclohexanecliamine, 1,4-cyclohexanecliamine, 1,3-bis (aminomethyl) cyclohexane, 1,4-bis (aminomethyl)cyclohexane, isophorone diamine, norbornene diamine, 3(4),8(9)-bis (aminomethyl)tricyclo [5.2.1.02,6]decane diamine and the like. The bismaleimide compound and the alicyclic diamine each can be used alone or in combination of two or more.

The reaction solvent when producing polyamino bismaleimide prepolymer is not particularly limited, but the examples thereof include 1,4-dioxane, tetrahydrofuran, chloroform, methylene chloride, methyl ethyl ketone and the like. The reaction conditions may be set appropriately, for example, at 10 to 60° C. for 10 minutes to 2 hours.

As another embodiment of the maleimide resin compound, compounds having such a structure that terminal maleimide group(s) is introduced into any polymeric structures may be exemplified. The position at which the terminal maleimide group is introduced is not particularly limited, and it may be a molecular chain terminal of the polymer structure or it may be an internal non-terminal position.

As maleimide resins compound, for example, polymers having maleimide group(s) at molecular chain terminal(s) are preferable. As the bismaleimide monomer having maleimide group(s) at molecular chain terminal(s), compounds represented by the following formula (13) are exemplified.

$$X(OR)_n \qquad (13)$$

(in formula (13), X represents a residue obtainable by removing hydroxyl groups from polyhydric alcohols, n is a number of hydroxyl groups of the polyhydric alcohol, and R independently represent a moiety of molecular weight of 100 to 5000 having maleimide group(s) at molecular chain terminal(s).)

Examples of the polyhydric alcohol to give the residue represented by X in formula (13) include dihydric or higher alcohols, cycloalkane polyols and sugar alcohols and sugars and the like.

Examples of polyhydric alcohols include, but not limited to, dihydric alcohols such as ethylene glycol, propylene glycol, dipropylene glycol, 1,3- and 1,4-butanecliol, and 1,6-hexanecliol; trihydric alcohols such as glycerine, trimethylol propane, trimethylol ethane, and hexane triol; tetravalent alcohols such as pentaerythritol, methyl glucoside, and diglycerin; polyglycerols such as triglycerol and tetraglycerol; poly pentaerythritols such as dipentaerythritol and tripentaerythritol; cycloalkane polyols such as tetrakis (hydroxymethyl) cyclohexanol; sugar alcohols such as adonitol, arabitol, xylitol, sorbitol, mannitol, iditol, talitol, maltitol and dulcitol; sugars such as glucose, mannoseglucose, mannose, fructose, sorbose, sucrose, lactose, raffinose and cellulose.

In formula (13), n is an integer of 2 to 20. In applications to impart shutdown function to a secondary battery to be described later, it is more preferable that n is 3 or more from the viewpoint of cross-linking. That is, the polymer is preferably a branched polymer having maleimide groups at molecular chain terminals represented by the above formula (13) and having maleimide groups at respective molecular chain terminals.

In the formula (13), R has a structure in which the maleimide group is introduced in any of polymer terminals. Here, the polymer structure is not particularly limited and can be selected suitably in accordance with the application, but examples thereof include, for example, acrylic-, polyether-, polycarbonate-, polyurethane-, epoxy-, alkyd-, and polyester-structure and the like having molecular weight of 100 to 5000. It is possible to control the affinity to the electrolyte solution by the density of functional groups. Since the carbonates and ethers are widely used as electrolyte solutions of a lithium ion battery, it is preferable that the polymer structure has any one of the moieties from polyether-, polycarbonate-, polyurethane-, and polyester-structure having high affinity with these solutions. Further, the polymer structure and the maleimide group may be bonded through a linking group, and the examples of the linking group include, for example, —O—, —CO—, —CO—O—, —Y—, —O—Y—, —CO—Y— (wherein, Y is a linear or branched alkylene group having 1 to 20 carbon atoms) and the like.

A branched polymer having a polyester structure as R in the above formula (13) can be obtained by reacting, for example as described in JP-A 2007-284643, a hydroxyl group-terminated polyester resin obtained by transesterification of polyester resin using a compound having 3 or more hydroxyl groups, with maleimide carboxylic acid.

As examples of branched polymers having a polyester structure as R, a compound formed from polylactic acid represented by the following formula (14) is exemplified.

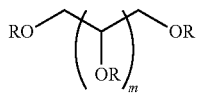
(14)

(in the formula (14),
m is an integer from 1 to 10,
R represents, independently, the following formula:

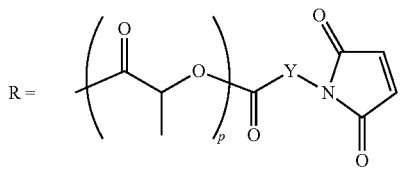

(wherein, p is an integer of 1 to 50, Y is a straight-chain or branched alkylene group having 1 to 20 carbon atoms.)

The molecular weight (mass average molecular weight) of the compound having a structure in which terminal maleimide group is introduce in the above any polymer structure is not particularly limited, but it is preferably in the range of 400 to 100,000, more preferably in the range of 800 to 20,000, and further more preferably in the range of 1,000 to 10,000.

In the present embodiment, the maleimide compound covers the surface of an electrode active material (preferably a positive electrode active material), and the coverage ratio of the maleimide compound to the surface area of the electrode active material is preferably at least 5% or more, more preferably 10% or more, more preferably 30% or more, more preferably 60% or more, further preferably 70% or more, whereas,it is preferably 98% or less, more preferably 95% or less, further more preferably 90% or less. In particular, it is preferably 60% to 95%, and more preferably 70% to 90%. The coverage ratio of the maleimide compound within the above range is preferred because when the battery becomes excessively high temperature condition, the movement of lithium ions is inhibited by cross-linking reaction of the maleimide compound. Herein, the coverage ratio of the maleimide compound can be determined by the mapping of nitrogen molecules by SEM-EDS capable of light element analysis.

In the present embodiment, the maleimide compound covering the surface of the electrode active material is intended to include also those present on the surface of the electrode active material via a first conductive agent, in addition to those in direct contact with the surface of the electrode active material.

(First Conductive Agent)

A first conductive agent is at least one selected from carbon nanotubes and carbon nanohorns. These are carbon materials formed from planar graphene sheets having a 6-membered ring of carbon, and function as a electric conductive agent in a secondary battery.

Carbon nanotubes have a single layer or a coaxial multilayered structure in which planar graphene sheets having a 6-membered ring of carbon are formed into a cylindrical shape, wherein the graphene plane and the fiber axis may or may not be parallel. Carbon nanotubes used in the present embodiment are preferably a multi-layer type, and more preferably a multi-layer type having 2 to 20 layers. Further, both ends of the cylindrical carbon nanotube may be open, but they are preferably closed with hemispherical fullerene containing 5-membered rings or 7-membered rings of carbon. The diameter of the outermost cylinder of carbon nanotubes is, for example, preferably 500 nm or less, more preferably 200 nm or less, more preferably 90 nm or less, more preferably 50 nm or less, and further more preferably 40 nm or less. The lower limit is not particularly limited, but it is preferably 0.5 nm or more, more preferably 5 nm or more, further more preferably 10 nm or more.

In carbon nanotubes, it is preferable that the average D/G ratio obtained from Raman spectroscopy is 0.1 or more, more preferably 0.2 or more, and is preferably 1.2 or less, more preferably 1.1 or less, more preferably 1.0 or less, more preferably 0.6 or less, and further preferably 0.4 or less. By using carbon nanotubes having average D/G ratio obtained by Raman spectroscopic measurement within the above range, it is possible to improve charge-discharge cycle characteristics of the battery using the electrode comprising the same. This is presumably because the carbon nanotubes having D/G ratio within the above range have few defects, and have low electronically resistance.

Raman spectrometry is one of the techniques used to evaluate the crystallinity of the surface of the carbon material. As the Raman band of graphite, G band (near 1580 to 1600 cm$^{-1}$) corresponding to the in-plane vibration mode and D-band (near 1360 cm$^{-1}$) based on defects in the plane are observed. When the peak intensity of these are taken as IG and ID, lower peak intensity ratio ID/IG indicates higher degree of graphitization. ID/IG ratio (referred to as D/G ratio) that is a ratio of the peak intensity IG of the G band corresponding to in-plane vibration mode in the circumferential plane of carbon nanotubes and the peak intensity ID of the D band based on defects in the circumference plane, is known that can be controlled mainly by heat treatment temperature, and the higher heat treatment temperature gives small D/G ratio, and the lower heat treatment temperature gives large D/G ratio.

As an average D/G ratio by the above Raman spectroscopy, a value determined by, for example, the following measurement method can be employed. Arbitrary 50 μm×50 μm of the projected image of the electrode active material is taken as the measurement surface, and the measurement spot size of Raman spectroscopy is set φ1 μm. Mapping measurement is carried out at a plurality of locations by shifting by 1 μm by 1 μm in the measurement surface. From the measured Raman light, D/G ratio is calculated for individual spots, and the average value thereof is takes as average D/G ratio. When carbon nanotubes do not exist in some spots and Raman peak based on carbon nanotubes is not observed, the spots are excluded from the average calculation.

In addition, carbon nanotubes (preferably carbon nanotubes having D/G ratio by the Raman spectroscopic measurement of 0.2 or more to 1.2 or less) preferably covers the surface area of the surface of the electrode active material in the range of 10% or more and 95% or less, and more preferably 40% or more and 80% or less. In the present specification, a percentage of the surface of electrode active material that is covered by carbon nanotubes is described as "coverage ratio" by carbon nanotubes. When the coverage ratio of the carbon nanotubes on the electrode active material is 10% or more and 95% or less, it is possible to improve the cycle characteristics of the secondary battery using the electrode comprising an electrode active material covered with a maleimide resin compound. On the other hand, if the coverage ratio is too high, the space between the electrode active materials may be filled with carbon nanotubes, or impregnation of the electrolyte solution into the space between the electrode active materials may be insufficient to block the absorption and desorption of lithium ions, or in the manufacturing process, it may take a long time to inject an electrolyte solution into the electrode active material layer.

Method for measuring the area of the covered surface of the electrode active material by carbon nanotubes having D/G ratio of 0.2 or more and 1.2 or less is performed, as similar to the measurement of average D/G ratio, by obtaining D/G ratio for respective spots in an arbitrary measurement surface of the positive electrode active material layer, and dividing the number of spots having D/G ratio of 0.2 or more and 1.2 or less by the total number of measured spots, and expressing the coverage in percentage to determine coverage ratio.

In this embodiment, the carbon nanotubes covering the surface of the electrode active material is intended to include also those present on the surface of the electrode active material via maleimide compound, in addition to those in direct contact with the surface of the electrode active material.

Coverage ratio of the electrode active material covered by carbon nanotubes can be controlled by the type and addition amount of the carbon nanotubes. When the entire surface of the electrode active material is covered by the carbon nanotubes, the coverage ratio of the electrode active material by carbon nanotubes converges to a value determined by the distribution of D/G ratio of carbon nanotubes. Therefore, to increase the coverage ratio, the entire surface of the positive electrode active material layer surface is preferably covered by using a carbon nanotube material having narrow distribution width of D/G ratio of 0.2 or more and 1.2 or less. Thus, the coverage ratio can be controlled by mainly changing the distribution of D/G ratio of the carbon nanotubes and the addition amount thereof.

The aspect ratio of the carbon nanotube is not particularly limited, but it is preferably 100 or more and 1,000 or less. The aspect ratio of the carbon nanotubes is the ratio of length to diameter of the carbon nanotube. If the aspect ratio of the carbon nanotubes is 100 or more, it is easy to cover the electrode active material by carbon nanotubes, and therefore the conduction between electrode active materials are attained. If the aspect ratio of the carbon nanotubes is 1000 or less, it is possible to suppress the reduction of the workability during a coating process of the electrode active material, and also it is possible to suppress a decrease in dispersibility and suppress the increase in viscosity during production of the slurry. The aspect ratio of carbon nanotubes is more preferably 150 or more, and further preferably 200 or more, and the upper limit is more preferably 950 or less, more preferably 900 or less, further preferably 700 or less. It is particularly preferably 200 or more and 900 or less.

The specific surface area of the carbon nanotube is preferably 40 m$^2$/g or more and 2000 m$^2$/g or less. Between the diameter and the specific surface area of carbon nanotubes, there is generally a relationship that the specific surface area increases as the diameter decreases. If the specific surface area is 2000 m$^2$/g or less, gas generation caused by the reaction of carbon nanotubes with an electrolyte solution can be suppressed. On the other hand, if the specific surface area is 40 m$^2$/g or more, the surface of a positive electrode active material can be covered efficiently. Since these carbon nanotubes are in fibrous form, they can efficiently cover positive electrodeactive material layers, and also have good characteristics as a electric conductive agent, in comparison with conventionally used conductive agents in particle forms such as Ketjen Black having a specific surface area of 800 m$^2$/g to 1300 m$^2$/g, or acetylene black having a specific surface area of 40 m$^2$/g to 100 m$^2$/g, or carbon black or the like.

A carbon nanohorn, if taken as a single piece, has such a shape that a single graphite sheet is rounded into cylindrical shape having diameter of about 2 nm to 4 nm wherein the distal end has conical shape with tip angle of about 20°. A plurality of these carbon nanohorns gather to form an aggregate, and the aggregate is classified broadly into Dahlia type and Bud type from their shapes.

The aggregate having such a shape that a plurality of carbon nanohorns gather and are connected to each other with conical tips outside to form a flower-shape of dahlia, is called Dahlia type carbon nanohorn aggregates.

The aggregate having a bud-like shape is called Bud type carbon nanohorn aggregate. Whereas plenty of the nanohorns are protruding from the aggregate surface in Dahlia type carbon nanohorn aggregate, Bud type carbon nanohorn aggregate has no horn-shaped protrusion on the surface and has a smooth surface, and thus it has been described as bud-like shape in contrast to dahlia flower. The average diameter of Bud type carbon nanohorn aggregate is 80 nm, and is slightly smaller than the average diameter of Dahlia type carbon nanohorn aggregate that is 100 nm. The present inventors speculate that a single nanohorn making up Bud type carbon nanohorn aggregate is slightly finer and shorter than that making up Dahlia type. Therefore, the inventors consider that Bud type has smaller aggregate diameter than Dahlia type (see, Azami et al., the present inventor, Carbon 45 (2007) 136). The width of a single nanohorn making up "Bud" type nanohorn aggregate is considered approximately 1.0 nm to 2.0 nm, and length is considered 30 nm to 40 nm, from the TEM photograph described in the above-mentioned paper.

The carbon nanohorn has, in the state of primary particle, a diameter of 50 nm to 100 nm. With respect to the size of secondary particle formed by gathering primary particles, the secondary particle of the carbon nanohorn is in the range of 0.1 μm to 5 μm. Further, the specific surface area of the carbon nanohorn is preferably 200 m²/g or more and 450 m²/g or less.

In the electrode of the present embodiment, the ratio (M/C) of the coverage M (%) of the maleimide compound on the electrode active material to the coverage C (%) of the first conductive agent on the electrode active material is not particularly limited, but is preferably 0.6 to 2, and more preferably 0.7 to 1.5. If M/C is within this range, since the carbon nanotubes suitably cover the surface of the active material of the positive electrode, the effect to reduce the electronic resistance between active materials is obtained, and since the maleimide resin appropriately covers the surface of the active material within this range, thermal runaway is reduced. That is, if the ratio (M/C) is in the range of 0.6 to 2, it is more easy to achieve a balance between the effects of reducing resistance and the effects of preventing thermal runaway of secondary batteries.

Next, there will be described components of the electrode other than the above-mentioned maleimide compound and the first conductive agent.

<Positive Electrode>

For example, the positive electrode preferably has a positive electrode current collector formed of a metal foil, and a positive electrode active material applied to one surface or both surfaces of the positive electrode current collector. The positive electrode active material is bound on the positive electrode current collector by a binder for a positive electrode so as to cover it, to form a positive electrode active material layer. The positive electrode current collector is arranged to have an extended portion connected to a positive electrode terminal, and the positive electrode active material is not applied to this extended portion.

The positive electrode of the present embodiment preferably comprises the maleimide compound and the first conductive agent, in addition to a positive electrode active material and a binder for a positive electrode.

Examples of an aspect of the positive electrode active material used in the present embodiment include lithium manganate having a layered structure or lithium manganate having a spinel structure such as $LiMnO_2$, $Li_xMn_2O_4$ (0<x<2), $Li_2MnO_3$, and $Li_xMn_{1.5}Ni_{0.5}O_4$ (0<x<2); $LiCoO_2$, $LiNiO_2$ or materials in which a part of the transition metal in these materials is replaced by other metal(s); lithium transition metal oxides in which particular transition metals do not exceed half, such as $LiNi_{1/3}Co_{1/3}Mn_{1/3}O_2$; materials in which Li is excessive as compared with the stoichiometric composition in these lithium transition metal oxides; materials having olivine structure such as $LiMPO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. In particular, $Li_\alpha Ni_\beta Co_\gamma Al_\delta O_2$ (1≤β≤2, β+γ+δ=1, β≥0.7, γ≤0.2) or $Li_\alpha Ni_\beta Co_\gamma Mn_{67}O_2$ (1≤α≤1.2, β+γ+δ=1, β≥0.6, γ≤0.2) are preferred. The positive electrode active materials may be used alone or in combination of two or more.

Further, it is also possible to use radical material as a positive electrodeactive material. In addition, as a positive electrode active material, it is also possible to use an active material that operates at 4.5 V or higher potential. As a positive electrode active material that operates at 4.5 V or higher potential, positive electrode active materials having structure of spinel type, olivine type, Si complex oxide, layered structure or the like are exemplified.

Among them, from the viewpoint of high capacity, the positive electrode active material preferably comprises a lithium nickelate having a layered structure represented by the following formula:

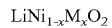
$LiNi_{1-x}M_xO_2$ (wherein, M represents at least one selected from the group consisting of Mn, Co, and Al, and 0≤x≤0.8.).

x is more preferably 0≤x≤0.5. Examples of the lithium nickel oxides represented by the above formula include $LiNiO_2$, $LiNi_{0.33}Co_{0.33}Mn_{0.33}O_2$, $LiNi_{0.5}Mn_{0.3}Co_{0.2}O_2$, $LiNi_{0.8}Mn_{0.1}Co_{0.1}O_2$, $LiNi_{0.5}Mn_{0.5}O_2$, $LiNi_{0.8}Mn_{0.2}O_2$ and the like. The positive electrode active material preferably comprises these high-capacity active material in an amount of 50 mass % or more, and more preferably 80 mass % or more, and even in an amount of 100 mass %.

A positive electrode active material according to another aspect of the present embodiment is not particularly limited as long as it is a material capable of absorb and desorb lithium, and can be selected from a number of viewpoints. From the viewpoint of high energy density, a compound having high capacity is preferably contained. Examples of the high capacity compound include lithium acid nickel ($LiNiO_2$), or lithium nickel composite oxides in which a part of the Ni of lithium acid nickel is replaced by another metal element, and layered lithium nickel composite oxides represented by the following formula (A) are preferred.

$Li_yNi_{(1-x)}M_xO_2$  (A)

wherein 0≤x<1, 0<y 1.2, and M is at least one element selected from the group consisting of Co, Al, Mn, Fe, Ti, and B.

In addition, from the viewpoint of high capacity, it is preferred that the content of Ni is high, that is, x is less than 0.5, further preferably 0.4 or less in the formula (A). Examples of such compounds include $Li_\alpha Ni_\beta Co_\gamma Mn_\delta O_2$ (0<α≤1.2, preferably 1≤α≤β+γ+δ=1, β≥0.7 and γ≤0.2) and $Li_\alpha Ni_\beta Co_\gamma Al_\delta O_2$ (0>β≤1.2, preferably 1≤α≤1.2, β+γ+δ=1, β≥0.7 and γ≤0.2) and particularly include $LiNi_\beta Co_\gamma Mn_\delta O_2$ (0.75≤β≤0.85, 0.05 0.85, 0.05≤γ≤0.15, and 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ (0<α≤1.2, preferably) 1≤α≤1.2, β+γ+δ=1, 0.2≤β≤0.5, 0.1≤γ≤0.4, and 0.1≤δ≤0.4). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including these compounds in which the content of each transition metal fluctuates by about 10%).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having olivine structure such as LiMPO4, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. The positive electrode active materials described above may be used alone or in combination of two or more.

Examples of the positive electrode binder include, but not particularly limited to, for example, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, polyacrylic acid and the like. Among them, polyimide and polyamide-imide are preferable because they have a strong binding property. The amount of the positive electrode binder is preferably 2 to 15 parts by mass based on 100 parts by mass of the positive electrode active material, from the viewpoint of the binding strength and energy density being in a trade-off relation with each other.

The positive electrode active material layer, in order to reduce impedance, preferably comprises the above first conductive agent, and if necessary, a conductive agent (second conductive agent) other than the first conductive agent may be further contained. Examples of the second conductive agent include carbonaceous fine particles such as acetylene black, carbon black and the like, and carbon black is preferred. The content of the second conductive agent is preferably 0.5 to 5 wt % based on the weight of the positive electrode active material.

As the positive electrode current collector, from the view point of electrochemical stability, aluminum, nickel, stainless steel, chromium, copper, silver, and alloys thereof are preferred. As the shape thereof, foil, flat plate, mesh and the like are exemplified.

<Negative Electrode>

The negative electrode preferably has a negative electrode current collector formed of metal foil and a negative electrode active material that is applied on one or both surfaces of the negative electrode current collector. The negative electrode active material is bound on the negative electrode current collector by a binder for a negative electrode so as to cover it, to form a negative electrode active material layer. The negative electrode current collector is arranged to have an extended portion connected to a negative electrode terminal, and the negative electrode active material is not applied to this extended portion.

Examples of the negative electrode active material include carbonaceous materials capable of absorbing and desorbing lithium ions such as cokes, glassy carbons, graphites, non-graphitizable carbons, and pyrolytic carbons and the like; metals such as Al, Si, Pb, Sn, Zn, Cd, Sb and the like and alloys of these with lithium; metal oxides such as $LiFe_2O_3$, $WO_2$, $MoO_2$, $SiO$, $SiO_2$, $CuO$, $SnO$, $SnO_2$, $Nb_3O_5$, $Li_xTi_{2-x}O_4$ ($0 \leq x \leq 1$), $PbO_2$, $PbO_5$ and the like; metal sulfides such as $SnS$, $FeS_2$ and the like; metal lithium, lithium alloy; lithium nitrides such as $Li_5(Li_3N)$, $Li_7MnN_4$, $Li_3FeN_2$, $Li_{2.5}Co_{0.5}N$, $Li_3CoN$. These materials can be used alone, or in combination of two or more.

Examples of the negative electrode binder include, but not particularly limited to, for example, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, polyacrylic acid and the like. Among them, polyimide and polyamide-imide are preferable because they have a strong binding property. The amount of the negative electrode binder is preferably 2 to 15 parts by mass based on 100 parts by mass of the negative electrode active material, from the viewpoint of the binding strength and energy density being in a trade-off relation with each other.

To the negative electrode active material layer, a conductive agent may be added in order to reduce impedance. The conductive agent may comprise the above first conductive agent, and in addition to or in place of this, a conductive agent (second conductive agent) other than the first conductive agent may be added. As a second conductive agent, carbon black, include carbonaceous fine particles such as acetylene black, carbon black is preferred. The content of the second conductive agent is preferably 0.1 to 10.0 wt % based on the weight of the negative electrode active material.

As the negative electrode current collector, from the view point of electrochemical stability, aluminum, nickel, stainless steel, chromium, copper, silver, and alloys thereof are preferred. As the shape thereof, foil, flat plate, mesh and the like are exemplified.

<Method of Manufacturing Electrode>

Method of manufacturing an electrode comprising a maleimide compound and the first conductive agent of the present embodiment is not particularly limited. Typically, the method comprises a step of mixing and stirring a maleimide compound, a first conductive agent, an electrode active material, an electrode binder, and if needed, a second conductive agent other than the first conductive agent in a solvent whereby preparing a electrode slurry, and a step of coating the electrode slurry on a collector and drying it. In the step of preparing the electrode slurry, the order of mixing the materials is not particularly limited. For example, a maleimide compound, a first conductive agent, an electrode active material and a binder may be mixed at the same time in a solvent; or a maleimide compound and a first conductive agent may be mixed in a solvent to prepare a dispersion of the first conductive agent, and then it is mixed with an electrode active material and a binder; or a maleimide compound and an electrode active material may be mixed in a solvent, and further mixing and stirring may be performed after a first conductive agent and a binder are added to the mixture. Temperature for drying the electrode slurry on the current collector is preferably less than 180° C. The solvent that can be used is not particularly limited as long as it dissolves the maleimide resin compound and does not dissolve the active material, and the examples thereof include, N-methylpyrrolidone (NMP), dimethylformamide (DMF), climethylacetamide (DMAC), pyrrolidone and N-dodecyl pyrrolidone. The step of preparing the electrode slurry by stirring and mixing may be usually carried out at room temperature, for 15 minutes or longer, preferably for 30 minutes or longer, and preferably within 3 days in view of the manufacturing process. the electrode active material covered with a maleimide compound and/or a first conductive agent may be, if necessary, purified by filtration, washing, drying and the like.

On preparing the electrode slurry, the amount of the maleimide compound is preferably 0.05 to 10 wt %, more preferably 0.1 to 10 wt %, and further preferably 0.5 to 3 wt % based on the weight of electrode active material. The amount of the first conductive agent is preferably 0.2 to 5.0 wt %, more preferably 0.5 to 5.0 wt %, further preferably 1.0 to 3.0 wt % based on the weight of electrode active material.

The amounts of the maleimide compound and the first conductive agent to be blended in the electrode slurry are, although it depends on the kind of the maleimide compound and the first conductive agent, preferably in a weight ratio of 1:10 to 10:1 for example.

<Basic Structure of Secondary Battery>

There are various types of secondary batteries depending on a structure of electrode or a shape, such as cylindrical type, flat spirally wound prismatic type, laminated square shape type, coin type, flat wound laminated type and layered laminate type or the like. The present invention is applicable to any of these types.

FIG. 1 shows a cross-sectional view of a laminate type lithium ion secondary battery according to the present embodiment. As shown in FIG. 1, a lithium ion secondary battery according to the present embodiment have a positive electrode comprising a positive electrode current collector 3 made of a metal such as aluminum foil and a positive electrode active material layer 1 containing a positive electrode active material provided thereon, and a negative electrode comprising an anode current collector 4 made of metal such as copper foil and a negative electrode active material layer 2 containing a negative electrode active material provided thereon. The positive electrode and the negative electrode are stacked via a separator 5 made of a nonwoven fabric or polypropylene microporous membrane so that the positive electrode active material layer 1 and the anode active material layer 2 are opposed to each other. This electrode pair is housed in an aluminum laminate film or the like inside the container formed by an outer packaging laminate 6. A positive electrode lead terminal 8 is connected to the positive electrode current collector 3, a negative electrode lead terminal 7 is connected to the negative electrode current collector 4, and these tabs are drawn out of the container. An electrolyte solution is injected into the container, and the container is sealed. It is also preferred that an electrode element (also referred to as "battery element" or "electrode stack") may have, as shown in FIG. 2, an arrangement in which a plurality of positive electrodes and a plurality of negative electrodes are stacked via separators.

Figure 3:
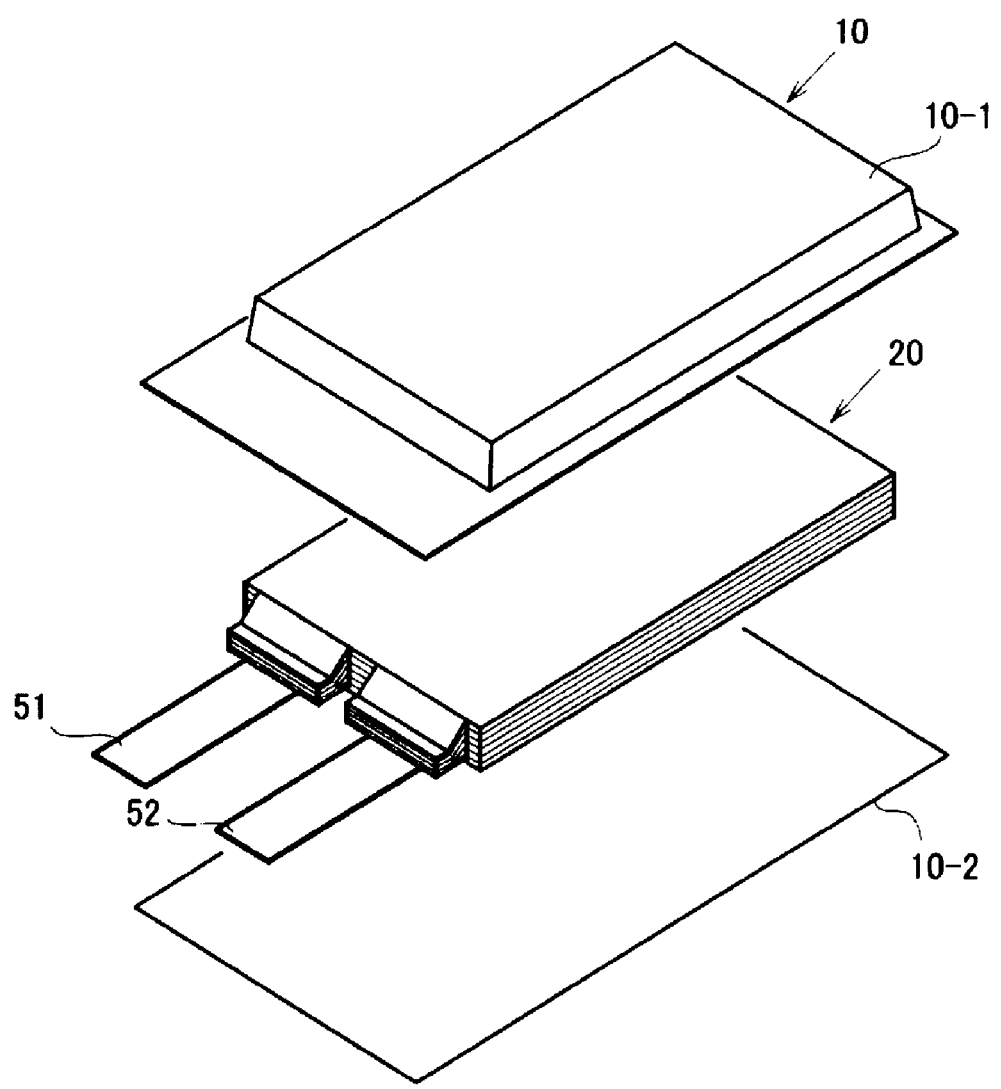
FIG. 3 shows an exploded perspective view showing a basic structure of a film package battery.
Figure 4:
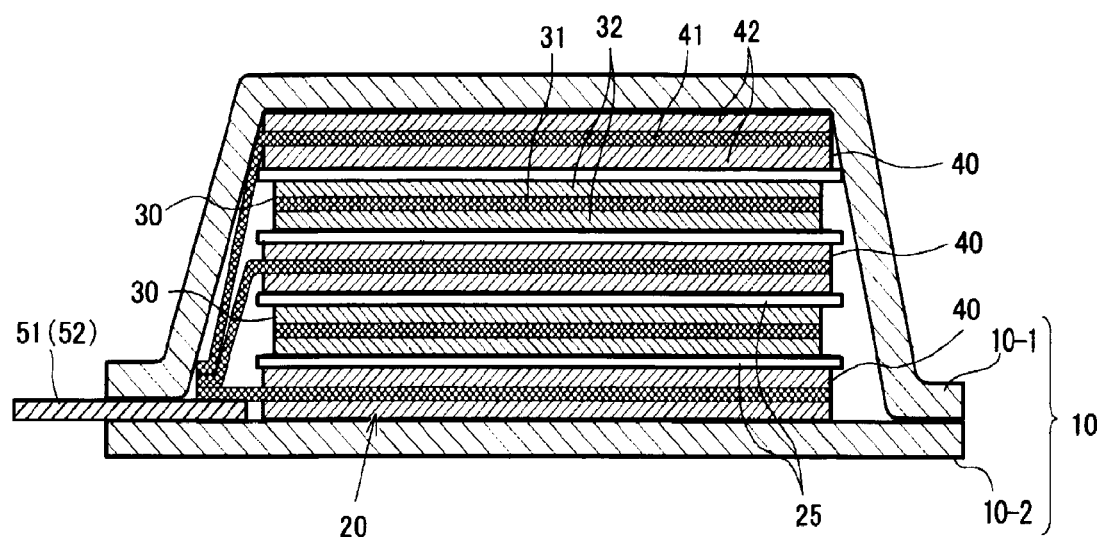
FIG. 4 shows a schematic cross-sectional view showing the cross-section of the battery of FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

Figure 2:
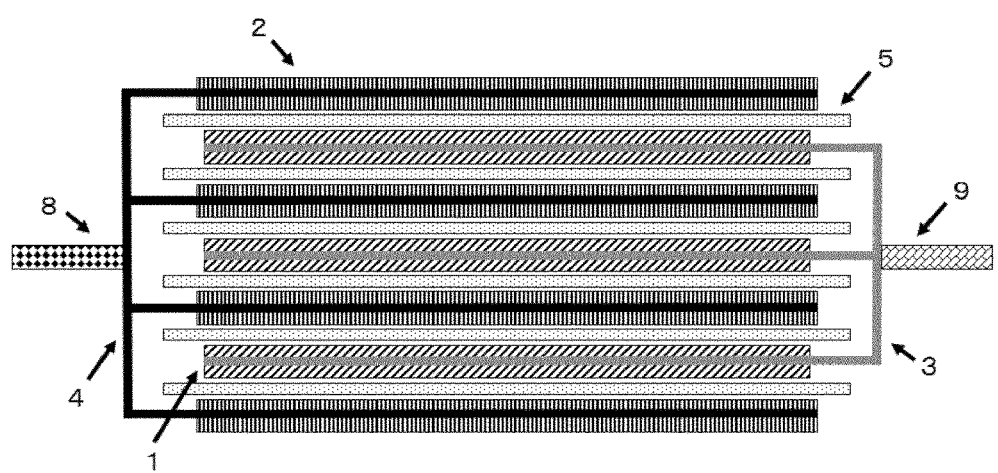
FIG. 2 shows a schematic cross-sectional view of the structure of a stack-laminate type secondary battery according to an embodiment of the present invention.

In the secondary battery in FIGS. 1 and 2, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Electrolyte Solution>

As an electrolyte solution used in the present embodiment, non-aqueous electrolyte solutions containing a lithium salt (supporting salt), and a non-aqueous solvent for dissolving the support salt are used.

As the non-aqueous solvents, aprotic organic solvents such as carbonic acid esters (open chain or cyclic carbonates), carboxylic acid esters (open chain or cyclic carboxylic acid esters), phosphoric acid esters and the like may be used.

Examples of the carbonic acid ester solvents include, cyclic carbonates such as propylene carbonate (PC), ethylene carbonate (EC), butylene carbonate (BC) and vinylene carbonate (VC); open chain carbonates such as dimethyl carbonate (DMC), diethyl carbonate (DEC), ethyl methyl carbonate (EMC) and dipropyl carbonate (DPC); and propylene carbonate derivatives.

Examples of the carboxylic acid ester solvents include aliphatic carboxylic acid esters such as methyl formate, methyl acetate and ethyl propionate; and lactones such as y-butyrolactone.

Among these, carbonic acid esters (cyclic or linear carbonate), such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC), are preferred.

Examples of the phosphoric acid esters include, for example, trimethyl phosphate, triethyl phosphate, tripropyl phosphate, trioctyl phosphate, triphenyl phosphate, and the like.

Examples of solvents that can be contained in the non-aqueous electrolyte solution include, in addition to those mentioned above, for example, ethylene sulfite (ES), propane sultone (PS), butane sultone (BS), clioxathiolane-2,2-dioxide (DD), sulfolene, 3-methylsulfolene, sulfolane (SL), succinic anhydride (SUCAH), propionic anhydride, acetic anhydride, maleic anhydride, diallyl carbonate (DAC), dimethyl 2,5-clioxahexaneclionate, dimethyl 2,5-dioxahexaneclionate, furan, 2,5-dimethylfuran, diphenyl sulfide (DPS), climethoxyethane (DME), dimethoxymethane (DMM), cliethoxy ethane (DEE), ethoxymethoxyethane, chloroethylene carbonate, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyltetrahydrofuran (2-MeTHF), tetrahydropyran (THP), 1,4-dioxane (DIOX), 1,3-clioxolane (DOL), methyl acetate, ethyl acetate, propyl acetate, isopropyl acetate, butyl acetate, methyl clifluoromethyl acetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, adiponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, carbonates electrolyte, glyme, ether, acetonitrile, propionitrile, y-butyrolactone, y-valerolactone, dimethyl sulfoxide (DMSO), ionic liquids, phosphazene, aliphatic carboxylic acid esters such as methyl formate, methyl acetate, and ethyl propionate, or compounds in which a part of hydrogen atoms of these compounds is/are substituted with fluorine atom(s).

Non-aqueous solvent may be used alone, or in combination of two or more.

As the supporting salt in the present embodiment, lithium salts that can be used in usual lithium ion batteries such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like can be used. Supporting salts may be used alone or in combination of two or more.

The separators that can be used include, but not particularly limited, porous films or nonwoven fabrics formed of, for example, polypropylene, polyethylene, fluororesin, polyamide, polyimide, polyester, polyphenylene sulfide and the like; or those in which inorganic materials such as silica, alumina, or glass are adhered or bonded to these base materials, or inorganic materials alone are processed into nonwoven fabrics or cloths. As a separator, those obtained by laminating these material may be also used.

An outer package can be appropriately selected as long as it has stability in an electrolyte solution and sufficient steam barrier properties. For example, in the case of a laminate type secondary battery, laminate films, such as polypropylene, polyethylene or the like coated with aluminium or silica can be used as the outer package. The outer package may be constituted by a single member or may be constituted by combining a plurality of members.

<Method of Manufacturing Secondary Battery>

The secondary battery according to the present embodiment can be manufactured according to conventional methods. For example, it is possible to manufacture a lithium ion secondary battery of the stacked laminate type in the following manner. First, according to the above, a positive electrode having a positive electrode active material layer provided on a positive electrode current collector, and a negative electrode having a negative electrode active material layer provided on a negative electrode current collector are formed.

Then, in dry air or inert atmosphere, the positive electrode and the negative electrode are placed to oppose to each other via a separator to form an electrode pair and to form an electrode stack having necessary numbers of laminations in accordance with a desired capacity. The electrode stack has a positive terminal to be connected to the positive electrode current collector, and a negative electrode terminal to be connected to the negative electrode current collector. Then, the electrode stack is accommodated in the outer package (container), by injecting a non-aqueous electrolyte solution and impregnating the electrode with the electrolyte solution. Then, the opening of the package is sealed to complete a secondary battery.

<Assembled Battery>

A plurality of secondary batteries according to the present embodiment may be combined to form an assembled battery. The assembled battery may be configured by connecting at least two secondary batteries according to the present embodiment in series or in parallel or in combination of both. The connection in series and/or parallel makes it possible to adjust the capacitance and voltage freely. The number of secondary batteries included in the assembled battery can be set appropriately according to the battery capacity and output.

<Vehicle>

The secondary battery or the assembled battery according to the present embodiment can be used in vehicles. Vehicles according to an embodiment of the present invention include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. Since these vehicles are equipped with a secondary battery according to the present embodiment, a high reliability and long life are ensured. The vehicles according to the present embodiment is not limited to automobiles, it may be a variety of power source of other vehicles, such as a moving body like a train.

<Power Storage Equipment>

The secondary battery or the assembled battery according to the present embodiment can be used in power storage equipment. The power storage devices according to the present embodiment include, for example, those which is connected between the commercial power supply and loads of household appliances and used as a backup power source or an auxiliary power in the event of power outage or the like, or those used as a large scale power storage that stabilize power output with large time variation supplied by renewable energy, for example, solar power generation.

A preferable aspect of the present embodiment includes a secondary battery electrode comprising a thermal activation material and a conductive agent, wherein the conductive agent comprises at least one selected from carbon nanotubes and carbon nanohorns. In the secondary battery comprising the secondary battery electrode, when it becomes excessively high temperature state in the overcharge or the like, the diffusion and conduction of lithium ions are suppressed by cross-linking reaction or the like of the thermal activation material, and the thermal runaway of the secondary battery is suppressed.

EXAMPLE

Hereafter, an embodiment of the present invention will be explained in details by using examples, but the present invention is not limited to these examples.

Materials used in Examples and Comparative Examples are shown below.

<Positive Electrode Active Material>

Positive electrode active material A: $LiNi_{0.8}Co_{0.2}O_2$
Positive electrode active material B: $LiNi_{0.5}Mn_{0.3}Co_{0.2}O_2$
Positive electrode active material C: $LiNi_{0.8}Mn_{0.1}Co_{0.1}O_2$ <Conductive agent>

In the following examples and comparative examples, carbon nanotubes A, B and C are described as "CNT-A", "CNT-B" and "CNT-C", respectively, and carbon black is described as "CB".

Average D/G ratio by Raman spectroscopy, average diameter, and aspect ratio of carbon nanotubes A to C and carbon black used in Examples and Comparative Examples are shown in Table 1. Raman spectrometry is one of the techniques often used to evaluate the crystallinity of the surface of the carbon material. As the Raman band of graphite, G band (near 1580 to 1600 $cm^{-1}$) corresponding to the in-plane vibration mode and D-band (near 1360 $cm^{-1}$) based on defects in the plane are observed. When the peak intensity of these are taken as IG and ID, lower peak intensity ratio ID/IG indicates higher degree of graphitization. ID/IG ratio (referred to as D/G ratio) that is a ratio of the peak intensity IG of the G band corresponding to in-plane vibration mode in the circumferential plane of carbon nanotubes and the peak intensity ID of the D band based on defects in the circumference plane, is known that can be controlled mainly by heat treatment temperature, and the higher heat treatment temperature gives small D/G ratio, and the lower heat treatment temperature gives large D/G ratio.

TABLE 1

| conductive agent | D/G ratio | average diameter (nm) | aspect ratio |
|---|---|---|---|
| carbon nanotube A (CNT-A) | 0.31 | 20 | 900 |
| carbon nanotube B (CNT-B) | 0.81 | 20 | 500 |
| carbon nanotube C (CNT-C) | 1.10 | 20 | 200 |
| carbon black (CB) | 1.10 | 60 | 1.0 |

<Maleimide Compound>

Synthesis of maleimide resin compound (hereinafter, "the maleimide compound A")

(1) To 250 mL three-neck round-bottom flask, 4.5 g of 4,4'-bismaleimide cliphenylmethane was added and 60 g of NMP solvent was added. The mixture was heated to 70° C. and stirred thoroughly to dissolve 4,4'-bismaleimide diphenylmethane completely in NMP solvent (R1).

(2) 1.8 g of barbituric acid (BTA) powder was added to 40 g of NMP solvent, and was stirred thoroughly to uniformly disperse BTA in NMP solvent as an emulsion (R2).

(3) (R2) wad divided into 8 equal parts, and one part was added batchwise every 15 minutes into (R1), and the mixture was stirred thoroughly to allow the thermal polymerization reaction of the double bond of 4,4'-bismaleimide cliphenylmethane to proceed.

(4) After all 8 parts of (R2) were added to (R1), the reaction was allowed to proceed for additional 4 hours. This gave a maleimide resin solution (R3) containing the maleimide compound A.

Example 1

Polyvinylidene fluoride (PVdF) as a binder in an amount of 3 mass % based on the mass of the positive electrode active material, maleimide compound A in an amount of 0.1 mass % based on the mass of the positive electrode active material, carbon nanotube A as a first conductive agent in an amount of 2.0 mass % based on the mass of the positive electrode active material, and layered lithium nickel oxides ($LiNi_{0.8}Co_{0.2}O_2$) having an average particle diameter of 8 µm in a remaining amount other than the above, are dispersed uniformly in NMP using a rotation revolution type three-axis mixer excellent in stirring and mixing, to prepare a positive electrode slurry. The positive electrode slurry were uniformly applied to a positive electrode current collector of aluminum foil with a thickness of 20 µm using a coater. After drying by evaporating NMP, the back side was also coated in the same way. After drying, the density was adjusted by roll press, to prepare positive electrode active material layers on both sides of the current collector. Mass per unit area of the positive electrode active material layer was 50 $mg/cm^2$.

96 mass % of massive artificial graphite having an amorphous carbon-based surface coating of average particle diameter of 10 µm as a negative electrode active material, 2 mass % of SBR as a binder, 1 mass % of CMC as a thickener, and 1 mass % of carbon black were added to and dispersed in water, to prepare a negative electrode slurry. The negative electrode slurry were uniformly applied to a negative electrode current collector of copper foil with a thickness of 10 µm using a coater. After drying by evaporating water, the density was adjusted by roll press, to prepare negative electrode active material layers. Mass per unit area of the negative electrode active material layer was 30 $mg/cm^2$.

As an electrolyte solution, 1 mol/L of $LiPF_6$ as an electrolyte was dissolved in a solvent of ethylene carbonate (EC):diethyl carbonate (DEC)=30:70 (vol %).

The resulting positive electrode was cut into 13 cm×7 cm, and the negative electrode was to cut into 12 cm×6 cm. The both surfaces of the positive electrode was covered by a polypropylene separator of 14 cm×8 cm, the negative active material layer was disposed thereon so as to face the positive electrode active material layer, to prepare an electrode stack. Next, the electrode stack was sandwiched by two sheets of aluminum laminate film of 15 cm×9 cm, the three sides excluding one long side were heat sealed with a seal width of 8 mm. After injecting the electrolyte solution, the remaining side was heat sealed, to produce a laminate cell type battery.

<Coverage of Conductive Agent on Surface of Positive Electrode Active Material>

D/G ratio by Raman spectroscopy was adopted for the measurement of coverage of the conductive agent on the surface of the positive electrode active material (carbon nanotube (CNT) and/or carbon black). Arbitrary 50 µm×50 µm of the projected image of the positive electrode active material is taken as a the measurement surface, and the measurement spot size of Raman spectroscopy is set φ1 µm. Mapping measurement (676 spots) is carried out by shifting by 1 µm by 1 µm in the measurement surface. From the measured Raman light, D/G ratio is calculated for individual spots. The coverage ratio of the conductive agent was determined by dividing the number of spots having D/G ratio in the range of 0.2 to 1.1 determined by Raman spectroscopy described above by the number of all measured spots, and expressing the numerical value as percentage.

The coverage ratio of the conductive agent on the surface of the positive electrode active material will be described as C (%) in Tables 2 to 5.

<Coverage of Maleimide Compound on Surface of Positive Electrode Active Material>

For the method of measuring coverage ratio of maleimide compound of on the surface of the active material, energy dispersive X-ray spectrometry was used. As energy dispersive X-ray analysis, values determined by the following measurement method can be employed.

Arbitrary 50 µm×50 µm of the projected image of the electrode active material is taken as a the measurement surface, and the measurement spot size of energy dispersive X-ray analysis is set φ1 µm. Mapping measurement (676 points) is carried out by shifting by 1 μm by 1 μm in the measurement surface. By measuring nitrogen (N)-originated peak, the coverage ratio of the maleimide compound is determined. At portions where carbon nanotubes cover the positive electrode, since carbon C is measured, the spot is excluded from the calculation of the average of the maleimide compound.

The coverage ratio of the maleimide compound on the surface of the positive electrode active material will be described as M (%) in Tables 2 to 5.

(Cycle Characteristics)
<Measurement of Capacity Retention Ratio>

1000 times of charge-discharge cycle test were performed in a thermostatic oven at 45° C. to measure the capacity retention ratio and to evaluate the lifetime. In the charge, the secondary battery was charged at 1 C up to maximum voltage of 4.2 V and then subjected to constant voltage charge at 4.2 V, and the total charge time was 2.5 hours. In the discharge, the secondary battery was subjected to constant current discharge at 1 C to 2.5 V. Although the charge and discharge cycles were performed at relatively high temperature of 45° C., this is because it is possible to identify cell characteristics deterioration at an early stage. The capacity after the charge-discharge cycle test was measured, and the ratio to the capacity before the charge-discharge cycle test was calculated. The results are shown in Tables 2 to 5.

(Safety Test)
<Overcharge Test>

Batteries of Examples 1 to 38 and Comparative Examples 1 to 46 were subjected to the overcharge test described in JIS C8712. The stack portion of batteries are fixed with flat press plates in constant gap in accordance with the thickness of the battery. Overcharge test was carried out at 10 A. The surface temperature of the battery reached 95° C. at the voltage of about 6 V, and after having reached to 10V, a battery that has finished test without emitting smoke is rated as ○, and a battery that has emitted smoke was rated as ×.

Evaluation criteria are as follows.
○: after having reached to 10V, the test finished without emitting gas.
×: emitted smoke.

The coverage ratios of the maleimide compound and conductive agent on the surface of the positive electrode active material, the measurement results of cycle characteristics, and the evaluation results of safety test are shown in Tables 2 to 5.

Example 2 to 38

Lithium ion secondary batteries were produced in the same manner as in Example 1, except that the kind and the blending amount of positive electrode active material, maleimide compound and conductive agent were changed as shown in Tables 2 and 3. The measurement of cycle characteristics and safety test (overcharge test) were carried out.

Comparative Examples 1 to 46

Lithium ion secondary batteries were produced in the same manner as in Example 1, except that either one of maleimide compound and carbon nanotube is not used and the kind and the blending amount of each material were changed as shown in Tables 4 and 5. The measurement of cycle characteristics and safety test (overcharge test) were carried out.

TABLE 2

| | positive electrode active material | maleimide compound | | first conductive agent | | second conductive agent | | maleimide coverage ratio M (%) | conductive agent coverage ratio C (%) | M/C ratio | cycle characteristics 45° C. @1000 cy (%) | safety |
|---|---|---|---|---|---|---|---|---|---|---|---|---|
| | | | Weight (wt %) | | Weight (wt %) | | Weight (wt %) | | | | | |
| Ex. 1 | A | A | 0.1 | CNT-A | 2.0 | none | 0.0 | 10 | 65 | 0.15 | 90 | ○ |
| Ex. 2 | A | A | 0.25 | CNT-A | 2.0 | none | 0.0 | 30 | 70 | 0.43 | 88 | ○ |
| Ex. 3 | A | A | 0.5 | CNT-A | 2.0 | none | 0.0 | 50 | 75 | 0.67 | 86 | ○ |
| Ex. 4 | A | A | 1.0 | CNT-A | 2.0 | none | 0.0 | 80 | 80 | 1.00 | 85 | ○ |
| Ex. 5 | A | A | 2.5 | CNT-A | 2.0 | none | 0.0 | 95 | 85 | 1.12 | 83 | ○ |
| Ex. 6 | A | A | 0.1 | CNT-B | 2.0 | none | 0.0 | 10 | 67 | 0.15 | 91 | ○ |
| Ex. 7 | A | A | 0.25 | CNT-B | 2.0 | none | 0.0 | 30 | 72 | 0.42 | 89 | ○ |
| Ex. 8 | A | A | 0.5 | CNT-B | 2.0 | none | 0.0 | 50 | 77 | 0.65 | 87 | ○ |
| Ex. 9 | A | A | 1.0 | CNT-B | 2.0 | none | 0.0 | 70 | 82 | 0.85 | 86 | ○ |
| Ex. 10 | A | A | 2.5 | CNT-B | 2.0 | none | 0.0 | 95 | 87 | 1.09 | 84 | ○ |
| Ex. 11 | A | A | 1.0 | CNT-B | 0.5 | none | 0.0 | 80 | 65 | 1.23 | 80 | ○ |
| Ex. 12 | A | A | 1.0 | CNT-B | 1.0 | none | 0.0 | 80 | 70 | 1.14 | 81 | ○ |
| Ex. 13 | A | A | 1.0 | CNT-B | 1.5 | none | 0.0 | 80 | 75 | 1.07 | 83 | ○ |
| Ex. 14 | A | A | 1.0 | CNT-B | 2.5 | none | 0.0 | 80 | 90 | 0.89 | 87 | ○ |
| Ex. 15 | A | A | 1.0 | CNT-B | 0.5 | CB | 2.0 | 80 | 68 | 1.18 | 81 | ○ |
| Ex. 16 | A | A | 1.0 | CNT-B | 1.0 | CB | 2.0 | 80 | 73 | 1.10 | 82 | ○ |
| Ex. 17 | A | A | 1.0 | CNT-B | 1.5 | CB | 2.0 | 80 | 78 | 1.03 | 84 | ○ |
| Ex. 18 | A | A | 1.0 | CNT-B | 2.5 | CB | 2.0 | 80 | 93 | 0.86 | 88 | ○ |

Ex. = Example

TABLE 3

| | positive electrode active material | maleimide compound | Weight (wt %) | first conductive agent | Weight (wt %) | second conductive agent | Weight (wt %) | maleimide coverage ratio M (%) | conductive agent coverage ratio C (%) | M/C ratio | cycle characteristics 45° C. @1000 cy (%) | safety |
|---|---|---|---|---|---|---|---|---|---|---|---|---|
| Ex. 19 | B | A | 1.0 | CNT-C | 0.5 | none | 0.0 | 80 | 65 | 1.23 | 82 | ○ |
| Ex. 20 | B | A | 1.0 | CNT-C | 1.0 | none | 0.0 | 80 | 70 | 1.14 | 83 | ○ |
| Ex. 21 | B | A | 1.0 | CNT-C | 1.5 | none | 0.0 | 80 | 75 | 1.07 | 85 | ○ |
| Ex. 22 | B | A | 1.0 | CNT-C | 2.0 | none | 0.0 | 80 | 80 | 1.00 | 87 | ○ |
| Ex. 23 | B | A | 1.0 | CNT-C | 2.5 | none | 0.0 | 80 | 90 | 0.89 | 89 | ○ |
| Ex. 24 | B | A | 1.0 | CNT-C | 0.5 | CB | 2.0 | 80 | 68 | 1.18 | 83 | ○ |
| Ex. 25 | B | A | 1.0 | CNT-C | 1.0 | CB | 2.0 | 80 | 73 | 1.10 | 84 | ○ |
| Ex. 26 | B | A | 1.0 | CNT-C | 1.5 | CB | 2.0 | 80 | 78 | 1.03 | 86 | ○ |
| Ex. 27 | B | A | 1.0 | CNT-C | 2.0 | CB | 2.0 | 80 | 83 | 0.96 | 88 | ○ |
| Ex. 28 | B | A | 1.0 | CNT-C | 2.5 | CB | 2.0 | 80 | 93 | 0.86 | 90 | ○ |
| Ex. 29 | C | A | 1.0 | CNT-C | 0.5 | none | 0.0 | 80 | 65 | 1.23 | 81 | ○ |
| Ex. 30 | C | A | 1.0 | CNT-C | 1.0 | none | 0.0 | 80 | 70 | 1.14 | 82 | ○ |
| Ex. 31 | C | A | 1.0 | CNT-C | 1.5 | none | 0.0 | 80 | 75 | 1.07 | 84 | ○ |
| Ex. 32 | C | A | 1.0 | CNT-C | 2.0 | none | 0.0 | 80 | 80 | 1.00 | 86 | ○ |
| Ex. 33 | C | A | 1.0 | CNT-C | 2.5 | none | 0.0 | 80 | 90 | 0.89 | 88 | ○ |
| Ex. 34 | C | A | 1.0 | CNT-C | 0.5 | CB | 2.0 | 80 | 68 | 1.18 | 82 | ○ |
| Ex. 35 | C | A | 1.0 | CNT-C | 1.0 | CB | 2.0 | 80 | 73 | 1.10 | 83 | ○ |
| Ex. 36 | C | A | 1.0 | CNT-C | 1.5 | CB | 2.0 | 80 | 78 | 1.03 | 85 | ○ |
| Ex. 37 | C | A | 1.0 | CNT-C | 2.0 | CB | 2.0 | 80 | 83 | 0.96 | 87 | ○ |
| Ex. 38 | C | A | 1.0 | CNT-C | 2.5 | CB | 2.0 | 80 | 93 | 0.86 | 89 | ○ |

TABLE 4

| | positive electrode active material | maleimide compound | Weight (wt %) | first conductive agent | Weight (wt %) | second conductive agent | Weight (wt %) | maleimide coverage ratio M (%) | conductive agent coverage ratio C (%) | M/C ratio | cycle characteristics 45° C. @1000 cy (%) | safety |
|---|---|---|---|---|---|---|---|---|---|---|---|---|
| Comp-Ex. 1 | A | none | 0.0 | CNT-B | 2.0 | none | 0.0 | 0 | 65 | 0.00 | 88 | x |
| Comp-Ex. 2 | A | none | 0.0 | CNT-B | 2.0 | none | 0.0 | 0 | 70 | 0.00 | 86 | x |
| Comp-Ex. 3 | A | none | 0.0 | CNT-B | 2.0 | none | 0.0 | 0 | 75 | 0.00 | 84 | x |
| Comp-Ex. 4 | A | none | 0.0 | CNT-B | 2.0 | none | 0.0 | 0 | 80 | 0.00 | 83 | x |
| Comp-Ex. 5 | A | none | 0.0 | CNT-B | 2.0 | none | 0.0 | 0 | 85 | 0.00 | 81 | x |
| Comp-Ex. 6 | A | none | 0.0 | CNT-C | 2.0 | none | 0.0 | 0 | 67 | 0.00 | 89 | x |
| Comp-Ex. 7 | A | none | 0.0 | CNT-C | 2.0 | none | 0.0 | 0 | 72 | 0.00 | 87 | x |
| Comp-Ex. 8 | A | none | 0.0 | CNT-C | 2.0 | none | 0.0 | 0 | 77 | 0.00 | 85 | x |
| Comp-Ex. 9 | A | none | 0.0 | CNT-C | 2.0 | none | 0.0 | 0 | 82 | 0.00 | 84 | x |
| Comp-Ex. 10 | A | none | 0.0 | CNT-C | 2.0 | none | 0.0 | 0 | 87 | 0.00 | 82 | x |
| Comp-Ex. 11 | A | none | 0.0 | CNT-B | 0.5 | none | 0.0 | 0 | 65 | 0.00 | 78 | x |
| Comp-Ex. 12 | A | none | 0.0 | CNT-B | 1.0 | none | 0.0 | 0 | 70 | 0.00 | 79 | x |
| Comp-Ex. 13 | A | none | 0.0 | CNT-B | 1.5 | none | 0.0 | 0 | 75 | 0.00 | 81 | x |
| Comp-Ex. 14 | A | none | 0.0 | CNT-B | 2.0 | none | 0.0 | 0 | 80 | 0.00 | 83 | x |
| Comp-Ex. 15 | A | none | 0.0 | CNT-B | 2.5 | none | 0.0 | 0 | 90 | 0.00 | 85 | x |
| Comp-Ex. 16 | A | none | 0.0 | CNT-B | 0.5 | CB | 2.0 | 0 | 68 | 0.00 | 79 | x |
| Comp-Ex. 17 | A | none | 0.0 | CNT-B | 1.0 | CB | 2.0 | 0 | 73 | 0.00 | 80 | x |
| Comp-Ex. 18 | A | none | 0.0 | CNT-B | 1.5 | CB | 2.0 | 0 | 78 | 0.00 | 82 | x |
| Comp-Ex. 19 | A | none | 0.0 | CNT-B | 2.0 | CB | 2.0 | 0 | 83 | 0.00 | 84 | x |
| Comp-Ex. 20 | A | none | 0.0 | CNT-B | 2.5 | CB | 2.0 | 0 | 93 | 0.00 | 86 | x |

Comp-Ex. = Comparative Example

TABLE 5

| | positive electrode active material | maleimide compound | | first conductive agent | | second conductive agent | | maleimide coverage ratio M (%) | conductive agent coverage ratio C (%) | M/C ratio | cycle characteristics 45° C. @1000 cy (%) | safety |
|---|---|---|---|---|---|---|---|---|---|---|---|---|
| | | | Weight (wt %) | | Weight (wt %) | | Weight (wt %) | | | | | |
| Comp-Ex. 21 | B | none | 0.0 | CNT-B | 0.5 | none | 0.0 | 0 | 65 | 0.00 | 80 | x |
| Comp-Ex. 22 | B | none | 0.0 | CNT-B | 1.0 | none | 0.0 | 0 | 70 | 0.00 | 81 | x |
| Comp-Ex. 23 | B | none | 0.0 | CNT-B | 1.5 | none | 0.0 | 0 | 75 | 0.00 | 83 | x |
| Comp-Ex. 24 | B | none | 0.0 | CNT-B | 2.0 | none | 0.0 | 0 | 80 | 0.00 | 85 | x |
| Comp-Ex. 25 | B | none | 0.0 | CNT-B | 2.5 | none | 0.0 | 0 | 90 | 0.00 | 87 | x |
| Comp-Ex. 26 | B | none | 0.0 | CNT-B | 0.5 | CB | 2.0 | 0 | 68 | 0.00 | 81 | x |
| Comp-Ex. 27 | B | none | 0.0 | CNT-B | 1.0 | CB | 2.0 | 0 | 73 | 0.00 | 82 | x |
| Comp-Ex. 28 | B | none | 0.0 | CNT-B | 1.5 | CB | 2.0 | 0 | 78 | 0.00 | 84 | x |
| Comp-Ex. 29 | B | none | 0.0 | CNT-B | 2.0 | CB | 2.0 | 0 | 83 | 0.00 | 86 | x |
| Comp-Ex. 30 | B | none | 0.0 | CNT-B | 2.5 | CB | 2.0 | 0 | 93 | 0.00 | 88 | x |
| Comp-Ex. 31 | C | none | 0.0 | CNT-B | 0.5 | none | 0.0 | 0.0 | 65 | 0.00 | 79 | x |
| Comp-Ex. 32 | C | none | 0.0 | CNT-B | 1.0 | none | 0.0 | 0.0 | 70 | 0.00 | 80 | x |
| Comp-Ex. 33 | C | none | 0.0 | CNT-B | 1.5 | none | 0.0 | 0.0 | 75 | 0.00 | 82 | x |
| Comp-Ex. 34 | C | none | 0.0 | CNT-B | 2.0 | none | 0.0 | 0.0 | 80 | 0.00 | 84 | x |
| Comp-Ex. 35 | C | none | 0.0 | CNT-B | 2.5 | none | 0.0 | 0.0 | 90 | 0.00 | 86 | x |
| Comp-Ex. 36 | C | none | 0.0 | CNT-B | 0.5 | CB | 2.0 | 0.0 | 68 | 0.00 | 80 | x |
| Comp-Ex. 37 | C | none | 0.0 | CNT-B | 1.0 | CB | 2.0 | 0.0 | 73 | 0.00 | 81 | x |
| Comp-Ex. 38 | C | none | 0.0 | CNT-B | 1.5 | CB | 2.0 | 0.0 | 78 | 0.00 | 83 | x |
| Comp-Ex. 39 | C | none | 0.0 | CNT-B | 2.0 | CB | 2.0 | 0.0 | 83 | 0.00 | 85 | x |
| Comp-Ex. 40 | C | none | 0.0 | CNT-B | 2.5 | CB | 2.0 | 0.0 | 93 | 0.00 | 87 | x |
| Comp-Ex. 41 | A | A | 3.0 | none | 0.0 | CB | 2.0 | 90 | 50 | 1.80 | 75 | o |
| Comp-Ex. 42 | B | A | 3.0 | none | 0.0 | CB | 2.0 | 90 | 50 | 1.80 | 76 | o |
| Comp-Ex. 43 | C | A | 3.0 | none | 0.0 | CB | 2.0 | 90 | 50 | 1.80 | 74 | o |
| Comp-Ex. 44 | A | A | 3.0 | none | 0.0 | none | 0 | 90 | 0 | 0.00 | 58 | o |
| Comp-Ex. 45 | B | A | 3.0 | none | 0.0 | none | 0 | 90 | 0 | 0.00 | 62 | o |
| Comp-Ex. 46 | C | A | 3.0 | none | 0.0 | none | 0 | 90 | 0 | 0.00 | 60 | o |

Lithium ion secondary batteries of Examples 1 to 38 were excellent in the results of cycle characteristics and safety tests. On the other hand, in Comparative Examples 1 to 40 using the positive electrode containing no maleimide compound had a problem in the results of the overcharge test. While comparative Examples 41 to 43 used positive electrodes containing only carbon black as a conductive agent, the results showed that they were inferior in cycle characteristics to a battery using carbon nanotubes as a conductive agent. While comparative Examples 44 to 46 used positive electrodes containing no conductive agent, the results showed that they were further inferior in cycle characteristics to Comparative Examples 41 to 43.

INDUSTRIAL APPLICABILITY

The battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for moving/transporting media such as trains, satellites and submarines including electrically driven vehicles such as an electric vehicle, a hybrid vehicle, an electric motorbike, and an electric-assisted bike; backup power supplies for UPSs; and electricity storage facilities for storing electric power generated by photovoltaic power generation, wind power generation and the like.

EXPLANATION OF REFERENCE

1 positive electrode active material layer
2 negative electrode active material layer
3 positive electrode current collector
4 negative electrode current collector
5 separator
6 laminate package
7 negative electrode lead terminal
8 positive electrode lead terminal
10 film package
20 battery element
25 separator
30 positive electrode
40 negative electrode

The invention claimed is:

1. An electrode for a secondary battery comprising a maleimide compound, a conductive agent and an electrode active material, wherein
   the maleimide compound is a maleimide resin compound comprising a repeating unit comprising a maleimide monomer residue and a dione compound residue,
   the conductive agent comprises at least one selected from carbon nanotubes and carbon nanohorns, and
   a ratio of a coverage of the maleimide compound on the electrode active material to a coverage of the conductive agent on the electrode active material is 0.15 to 2.

2. The secondary battery electrode according to claim 1, wherein the maleimide compound has two or more maleimide groups.

3. The secondary battery electrode according to claim 1, wherein the maleimide compound comprises a polymer which is a reaction product of a bismaleimide and a barbituric acid.

4. The secondary battery electrode according to claim 1, wherein the conductive agent comprises a carbon nanotube.

5. The secondary battery electrode according to claim 4, wherein the average D/G ratio according to Raman spectroscopic measurement of the carbon nanotube is 0.2 to 1.2.

6. The secondary battery electrode according to claim 4, wherein the aspect ratio of the carbon nanotube is 200 to 900.

7. The secondary battery electrode according to claim 1, wherein the conductive agent further comprises carbon black.

8. A secondary battery comprising the secondary battery electrode according to claim 1.

9. The secondary battery according to claim 8 comprising the secondary battery electrode as a positive electrode.

10. An assembled battery comprising the secondary battery according to claim 8.

11. The secondary battery electrode according to claim 1, wherein the ratio is 0.15 to 1.

12. The secondary battery electrode according to claim 1, wherein an amount of the maleimide compound is 0.1 to 1.0 wt % of the electrode active material and an amount of the conductive agent is 0.5 to 4.5 wt % of the electrode active material.

13. The secondary battery electrode according to claim 1, wherein the maleimide compound is a maleimide resin compound prepared by reacting a maleimide monomer and a dione compound in a solvent containing a Bronsted base.

14. The secondary battery electrode according to claim 1, wherein an amount of the maleimide compound is 0.1 wt % or less of the electrode active material.

* * * * *